United States Patent [19]

Bigwood

[11] Patent Number: 5,556,206
[45] Date of Patent: Sep. 17, 1996

[54] REPLACEMENT WIPER FOR LINEAR BEARING SYSTEMS

[75] Inventor: Guy M. Bigwood, Hamden, Conn.

[73] Assignee: Ameropean Corp., North Haven, Conn.

[21] Appl. No.: 327,983

[22] Filed: Oct. 24, 1994

[51] Int. Cl.⁶ ............................................. F16C 33/76
[52] U.S. Cl. .............................................. 384/15
[58] Field of Search ................................ 384/15, 43, 44, 384/45

[56] References Cited

U.S. PATENT DOCUMENTS

| | | | |
|---|---|---|---|
| 3,785,418 | 1/1974 | Hennig et al. | 384/15 |
| 4,886,376 | 12/1989 | Osawa | 384/15 |
| 5,149,204 | 9/1992 | Tennichi | 384/15 |
| 5,149,205 | 9/1992 | Tsukada | 384/15 |
| 5,186,544 | 2/1993 | Eder et al. | 384/15 |

*Primary Examiner*—Thomas R. Hannon
*Attorney, Agent, or Firm*—Charles Blaich

[57] ABSTRACT

Wiper for guide rails for linear motion systems which incorporates two inverted "L" shaped plates bonded to a flexible elastomer pad. The metal plates having a gap therebetween to permit the wiper to be flexed over the guide rails.

2 Claims, 3 Drawing Sheets

REPLACEMENT WIPER FOR LINEAR BEARING SYSTEMS

BACKGROUND OF THE INVENTION

One of the major improvements in metal machining has been the development of electronically controlled machining equipment (CNC). The demands for higher accuracy and performance brought about by this technology has fostered the development of Linear Motion Systems. These systems generally have specifically designed rails which are fastened onto the machine tool bed or table and guides or carriages which traverse the rail. These carriages generally have ball or roller bearings with appropriate races incorporated therein. The configuration of the carriages/rails being notched or having undercuts on which the bearings ride. The linear bearing system yielding significantly greater accuracy of traverse and loading capability at reduced power consumption because of reduced friction in comparison to the now obsolete slide rail configuration.

Although dimensions and configuration of rails and carriages vary depending upon manufacturer and loading demands they all use rubber wipers to cleanse the rail of metal cuttings to prevent the same from entering into the carriage bearings as the carriage traverses the rail. As is well known, such metal cuttings contamination effectively ruins bearing systems.

As stated earlier, the configuration of the matched rail-carriage systems have undercuts in the rail on which the bearings ride. The rubber wipers have a similar configuration so as to conform to the rail. In the current art, the rubber wipers are held in place by separate like configured metal place which is fastened to the carriage to support the rubber wiping lips which are in contact with the rail.

Most linear bearing carriages are used in multiples to balance a compound, for example on a lathe. Both ends of the carriages have wipers located thereon to wipe the rails as the carriages traverse the same. Removal of the outer wiper is relatively easy because the carriages working in tandem can be moved to the end of the rail where the wiper assembly can readily be slid off the end of the rail. The wiper on the inner end of the carriages presents the problem wherein the compound or other machine component that is located thereon must be removed from the carriages before the carriages can be removed from the rail to provide access to the inner wiper. The solution to this problem has been the use of elastomer wipers with separate backing plates which are bolted to the carriage through the elastomer wiper for replacement. The backing plate must then be precisely aligned over the wiper and fastened to the carriage face. Extreme care is required in this procedure to prevent distortion and tearing of the wiper lips.

Bonding metal backing plates to the elastomer in a mold for precise geometry eliminates that problem but because such wipers with bonded metal backing plate which cannot be removed over the rail but rather only from an end of a rail. Thus the machine must be disassembled so that the worn metal plate bonded wiper can be removed from the rail and replaced. Such removal is costly, in many instances requiring over fifty hours of non-production down time to remove/replace wipers. Replacement of the wiper must be done on a routine basis depending upon the extent of the machine's usage and type of metals being cut. Not doing so assures the costly replacement of rails and bearing carriages as accuracy of machining decreases and friction increases because of wear to the bearings and rails.

OBJECT OF THE INVENTION

An important object of the invention to provide a wiper bonded to a metal backing plate for rail bearing guide linear motion systems that can be installed over and onto the rail without the need to disassemble the machine.

It is another object of the invention to provide an easy to replace wiper with the same lip configuration, degree of flexibility and wiping action as a properly installed state of the art wiper and separate metal backing plate.

It is yet another object of the invention to provide a readily replaceable wiper which because of the simplicity of removal and installation can routinely be replaced during other scheduled maintenance.

SUMMARY OF THE INVENTION

Wipers currently used in linear bearing systems are inverted "U" shaped elastomer wiper and separate metal or rigid plastic backing plates. The inner wall of the inverted "U" shaped elastomer wiper generally conforms to the cross sectional configuration of the rail but with a gap which is filled with elastomeric lips which extend from the metal backing plate. The outer walls of the inverted "U" shaped elastomer wiper and metal backing plate conform to the dimensions and configuration of the carriage.

Wipers and separate metal backing plates are threadably affixed to the carriage face by bolts which pass through holes provided in the face of both the elastomer wiper and metal backing plate in alignment with threaded holes in the carriage face.

As stated earlier, the problem of mlsalignment of the elastomer wiper and separate backing plate can be overcome by bonding the backing plate to the elastomer wiper. That presents problems because the bonded metal backed wiper can only be removed from the rail by sliding it over the rail end. This problem has been overcome in the instant invention wherein two inverted "L" shaped metal plates are bonded to the flat elastomer wiper. The bases of the inverted "L" shape do not meet leaving a gap in the metal backing. The elastomeric wiper extends as before into the complete inverted "U". This gap permits the flexing of the elastomer wiper so that the wiper and support plates can readily be placed over the rail then returned to the original inverted "U" configuration. Subsequently the attachment of the wiper to the carriage's face rigidifies the split metal bonded elastomer wiper.

Wipers may also be supplied without holes. This permits the user to drill holes to accommodate various configurations of carriage faces.

DETAILED DESCRIPTION

Figure 1:
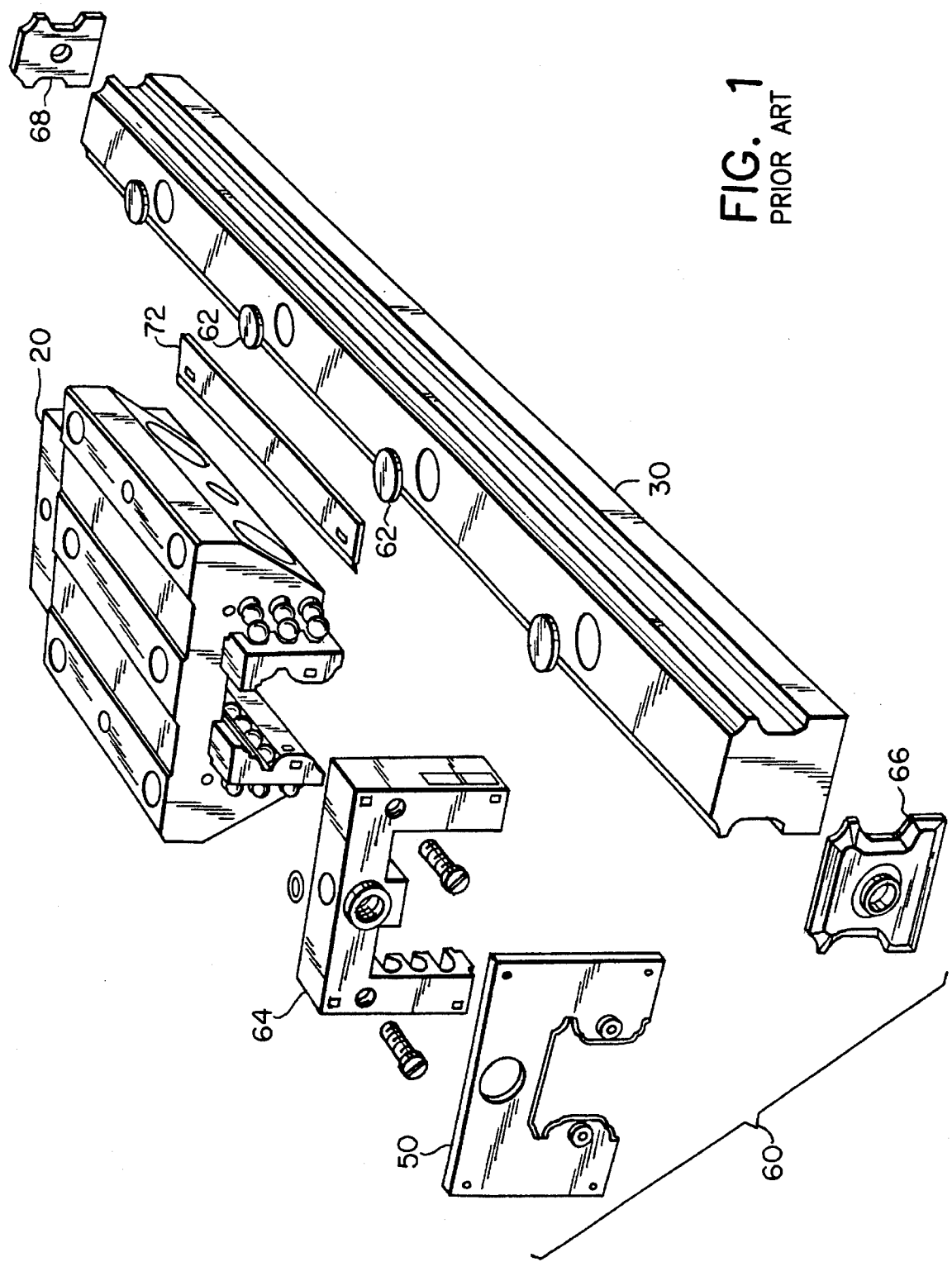
FIG. 1—Depicts the typical configuration of the current art.

FIG. 1 illustrates current art with assembly 60, which includes guide rail 30 which has closing plugs 62 which cover fasten down bolt holes which are used to fasten guide rail 30 to the CNC machine bed. Forward and aft mounting caps 66 and 68 respectively protect the ends of guide rail 30. Composite wiper 50 is affixed to head piece 64 thence to carriage 20 which fits over and conforms to guide rail 30 wiping metal chips and the like as carriage 20 moves along guide rail 30 during machine operation. Longitudinal wiper 72 performing a similar role when affixed to carriage 20.

Figure 2:
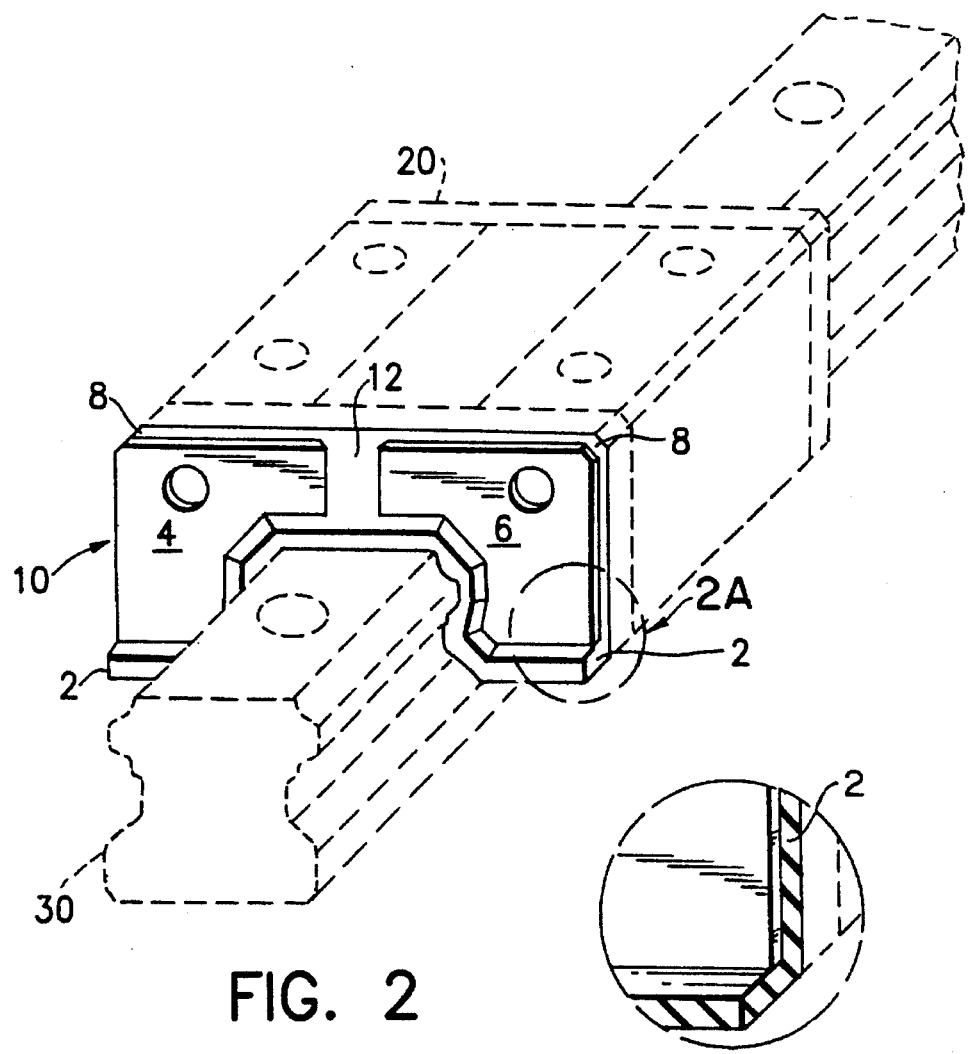
FIG. 2 illustrates the wiper of the instant invention mounted on the guide or carriage on the rail or guideway of a linear bearing system.
Figure 2A:
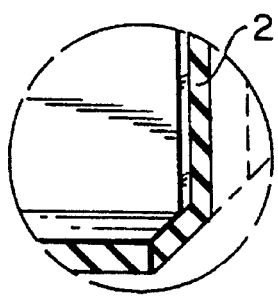
Figure 3:
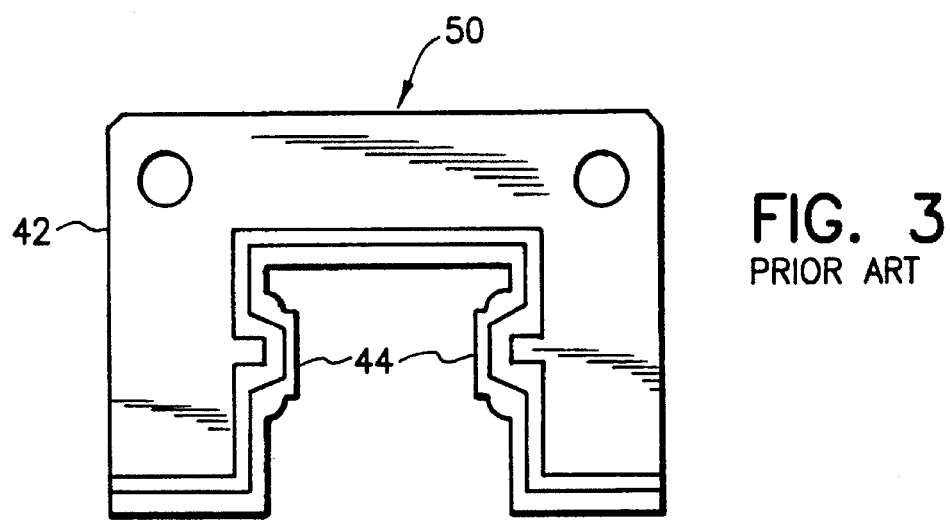
FIG. 3 Depicts the wiper of current art.
Figure 4:
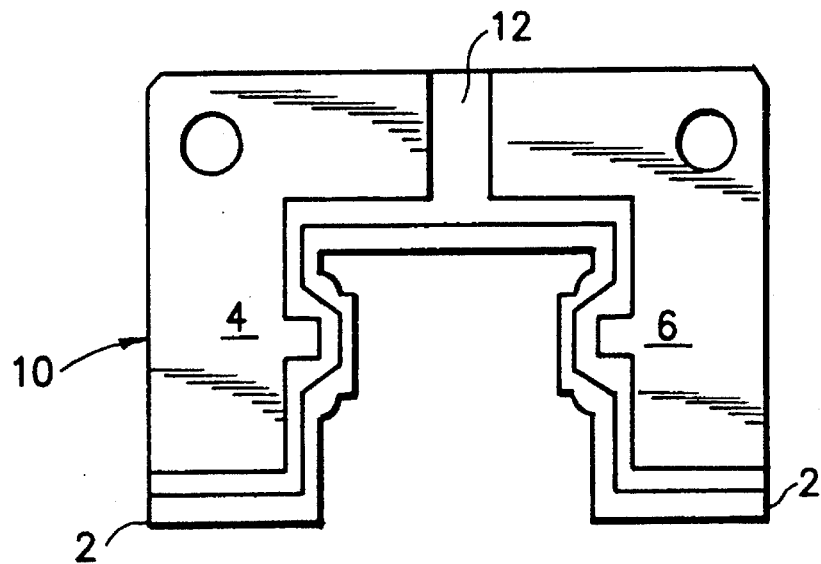
FIG. 4 Depicts the wiper of the instant invention.
Figure 5:
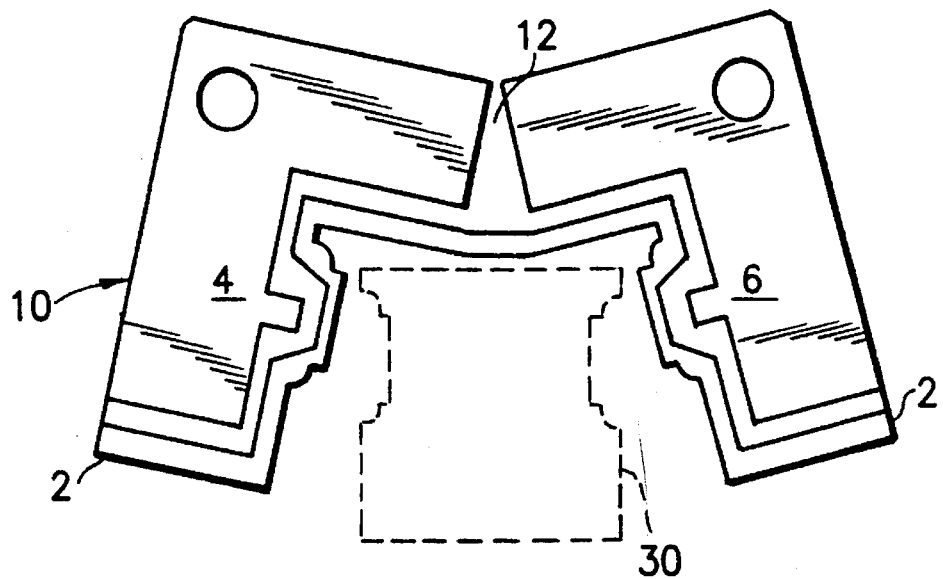
FIG. 5 Illustrates the placing of the instant wiper on the rail or guideway.

FIG. 2 illustrates wiper 10 with elastomeric wiping edge 2 shown in place on carriage or guide head 20 shown in relief on guide rail or guideway 30 shown in relief. Two flat inverted "L" shaped metal plates 4 and 6 shown in place bonded to flat elastomer portion 8. Gap 12 is shown between the two flat metal plates in FIGS. 2, 4 in non-distorted form and as distorted, FIG. 5, as wiper 10 is placed over guide rail 30 shown in relief. As can be seen gap 12 can be relatively narrow in ratio to the size of the wiper assembly and guide or rail cross section. Dimension 12 need only be sufficiently wide to permit the sections of the wiper bonded to the flat inverted "L" shaped metal plates to rotate sufficiently to clear top rail or guideway 30 before being rotated to the original inverted "U" shaped configuration to contact sides of rail 30. The bonded elastomer wiper and backing plates are then threadably affixed to carriage 20 FIG. 2.

The composite wiper formed in current technology without the advantage of the instant invention is made up of an inverted "U" shaped elastomer plate 40, which is bonded to inverted "U" shaped metal plate 42 with lips 44 extending over and beyond the metal reinforcing plate. The lips extending from laminate wiper 50 to engage and slideably cleanse rail 30 as the carriage assembly 20 lineally moves along rail 30. This action prevents cuttings from entering into carriage 20 to cause wear to bearings located therein. It, however, required disassembly of the machine to install. As stated earlier, a disadvantage overcome by the instant invention.

A number of elastomeric compositions are useful in the instant invention. The major criteria is that the elastomers be able to withstand an approximated 100% elongation then return to the original dimensions. Such elongation occurring as wiper 10 is spread to accommodate rail 30 during its installation. In addition the elastomer must have good abrasion, tear resistance and cutting oil resistance. Such elastomers and compounds thereof include polychloroprene, acrylonitrile-butadiene polymers, polyurethane elastomers and blends thereof.

The foregoing details are exemplary only and are not illustrative of the principles of this invention and are not to be interpreted to limit the scope of the invention.

What is claimed is:

1. An improved elastomer wiper for guide rails in linear motion systems wherein said improved wiper comprises a flat inverted "U" shaped elastomer pad, said pad having inner walls which conform to the configuration of said guide rails and wiper lips which contact said guide rails, said "U" shaped pad having outer walls which conform to the configuration of the carriage face which traverses said guide rails, said pad extending between said inner and outer walls, said pad having holes therethrough, said holes aligning with threaded holes in said carriage face, two inverted "L" shaped metal plates said metal plates being bonded to said inverted "U" shaped pad, conforming to said outer wall base and top, said two plates having a gap therebetween on said top exposing a portion of said elastomer pad, said metal plates conforming to support said wiper lips on said inner walls of said inverted "U" shaped pad, said bonded wiper having holes therethrough, said holes in alignment with said holes in said pads and threaded holes in said carriage end, said gap between said inverted "L" shaped metal plates permitting said exposed elastomer to be flexed over said guide rails and fastened to said carriage ends by bolts passing through said holes to threadably engage said carriage end to rigidly fasten said wiper assembly to said carriage end wherein said supported wiper lips engage said guide rails.

2. The improved guide rail wiper wherein the elastomers useful for said elastomer pad are selected from the group consisting of polychloroprene, acrylonitrile-buta-diene polymers; polyurethane elastomers and blends thereof.

\* \* \* \* \*